United States Patent [19]

Uchiyama et al.

[11] 3,738,237
[45] June 12, 1973

[54] EXPOSURE QUANTITY CONTROL DEVICE FOR CAMERA

[75] Inventors: Takashi Uchiyama; Tadashi Ito, both of Yokohama; Mutsuhide Matsuda, Tokyo; Mitsutoshi Ogiso, Kawasaki, all of Japan

[73] Assignee: Canon Kabushiki Kaisha, Tokyo, Japan

[22] Filed: Nov. 2, 1970

[21] Appl. No.: 86,184

[30] Foreign Application Priority Data
Nov. 5, 1969 Japan.................................. 44/88588

[52] U.S. Cl............................... 95/10 CT, 95/64 A
[51] Int. Cl........................... G03b 7/08, G03b 7/16
[58] Field of Search .......... 95/10 C, 10 CT, 53 EB, 95/64 D, 64 A

[56] References Cited
UNITED STATES PATENTS

| 3,426,661 | 2/1969 | Wick et al. ....................... | 95/10 CT |
| 3,460,450 | 8/1969 | Ogihara............................. | 95/10 C |
| 3,487,757 | 1/1970 | Kiper................................. | 95/10 CT |
| 3,452,656 | 7/1969 | Ruhle et al........................ | 95/10 C |
| 3,421,812 | 1/1969 | Kubota ............................. | 95/64 D |

Primary Examiner—Samuel S. Matthews
Assistant Examiner—Russell E. Adams, Jr.
Attorney—McGlew & Toren

[57] ABSTRACT

The disclosed exposure quantity control device for a camera, includes an exposure quantity determination circuit S and an indicating circuit I for indicating whether or not the camera is operating within an acceptable range. The inputs to said S and I circuits are formed by an output signal at a voltage dividing point of an input circuit that increases photographic information. An indication of proper or improper exposure is obtained for both EE and flash photography by said indicating circuit.

22 Claims, 7 Drawing Figures

EXPOSURE QUANTITY CONTROL DEVICE FOR CAMERA

BACKGROUND OF INVENTION

The present invention is intended to provide an exposure quantity control device for a camera, which device serves for indicating whether a proper or improper exposure conditions exist during EE (electronic eye) photography and for indicating whether proper or improper exposure conditions exist for flash photography when the camera is set for flash photographing.

Devices of this kinds have already been proposed, but in each of them insufficient consideration has been given to adapting them to flash photography. It is an object and characteristic feature of the present invention to provide an exposure quantity control device sufficiently which considers these aspects.

The various features characterizing the invention are pointed out in the claims. Other objects and advantages of the invention will become evident from the following detailed description when read in light of the accompanying drawings.

DESCRIPTION OF THE PREFERRED EMBODIMENTS

Figure 1:
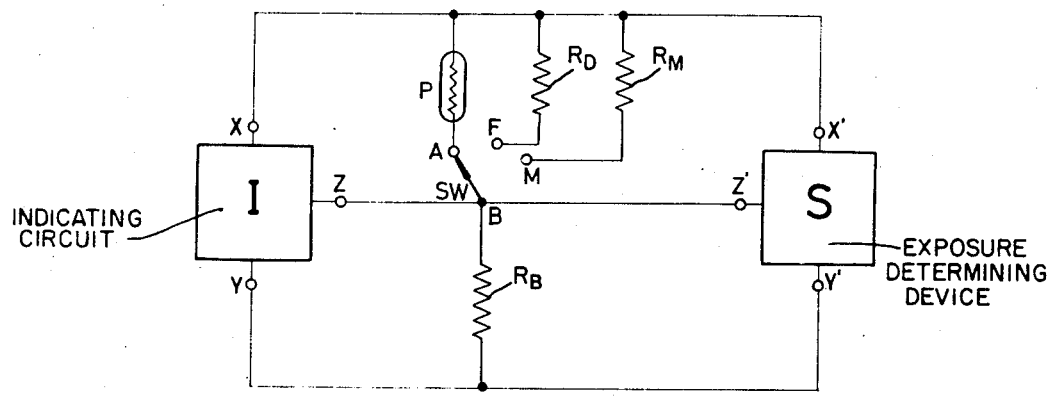
FIG. 1 is a diagram showing the principle of an exposure quantity control device for a camera according to the present invention.

FIG. 1 shows a block diagram of an exposure quantity control device in accordance with the present invention. In the drawing, reference symbol P designates a photo-responsive resistance device such as photoresistor or the like, $R_D$ a resistance device being varied according to photographic information signals such as the distance to the object to be taken or the like, and $R_M$ a resistance device whose resistance value is varied corresponding to a manual setting position. One end of each of these resistance devices is connected to an exposure quantity determination circuit S and an indicating circuit I respectively. The other ends A, F and M are selectively connected to a switch $S_W$ being switched and set by, for example, a switching ring provided on a lens drum. The other end of the switch $S_W$ is connected to a connection point B, which in turn is connected to an input end of the exposure quantity determination circuit S, an input end of the indicating circuit I, and one end of a dividing resistor $R_B$. The other end of the dividing resistor $R_B$ is connected to the exposure quantity determination circuit S and the indicating circuit I respectively. A power source may be provided only in the exposure quantity determination circuit S, or may be also provided in the indicating circuit, and an earth terminal may be provided corresponding to a circuit construction in order to set a bias appropriately. The input circuit may be made in such a simple construction eliminated the manual resistance device $R_M$ that terminals A and B are permanently connected and that the terminals B and F are arranged to connect only in the flash photographing. The change-over switch may be provided at an opposite side to the connection point B of the resistance devices.

Figure 2:
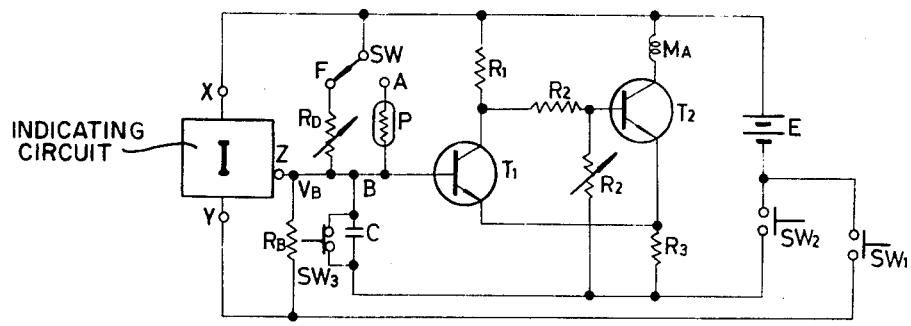
FIGS. 2 and 3 are electrical connection diagrams of an embodiment showing the details of an exposure quantity determination circuit thereof.
Figure 3:
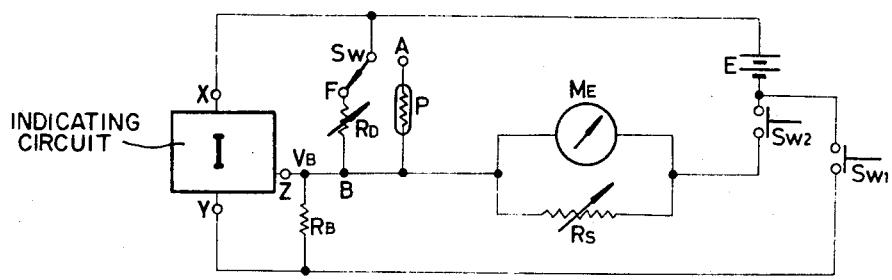

FIGS. 2 and 3 show detail of the construction of the exposure determination circuit S. FIGS. 4 to 7 show the details of the indicating circuit I. The input circuit is illustrated as a separate one with respect to S and I, although it at least partially belongs to S as well as I.

In FIG. 2, reference symbols $S_{W_1}$, $S_{W_2}$ and $S_{W_4}$ designate switches interlocking with a shutter release button, $S_W$ a change-over switch between the EE photography and flash photography, and $T_1$ and $T_2$ transistors forming a Schmitt circuit with resistors $R_1$, $R_2$, $R_3$ and $R_S$ and a magnet $M_A$.

The magnet $M_A$ has the function of determining an iris diaphragm diameter and/or a shutter velocity. The resistance $R_S$ is a variable resistance being regulatable corresponding to the sensitivity of the film and/or a guide number of the flash. Reference symbol P designates a photoconductive element composed of CdS or the like, and $R_D$ a variable resistance varying according to the photography information such as photography distance or the like. The resistance of resistor LD interlocks and varies with the rotation of the distance ring, etc.

Reference symbol C is a condenser which forms a time constant circuit corresponding to the resistance value of P or $R_D$. The terminal voltage of said condenser becomes the input signal to the exposure quantity determination circuit. Reference symbol $R_B$ is one which divides the voltage of the power source E by means of P and/or $R_D$, and which adapts the divided voltage at the point B to the input of the indicating circuit I.

FIG. 3 shows the exposure quantity determination circuit incorporating an exposure meter. Reference symbols $S_{W_1}$ and $S_{W_2}$ designate switches being set to the ON position when the shutter release button is pressed down, $S_W$ a change-over switch of either EE photographing or flash photographing, and $M_E$ an ampere meter. The description of reference symbols $R_D$, P, $R_B$, $R_S$, E and I are omitted, because they have been described in reference to FIGS. 1 and 2. However, P is preferably used with one wherein the characteristics are different in cases of the iris diaphragm predetermination and of the shutter velocity predetermination and in case of the programming although many kinds of construction thereof are readily evident and the change-over means can be provided as necessary, they are schematically shown as a typical representation of the EE photographic operation herein. Accordingly, the ammeter $M_E$ indicates the iris diaphragm and/or shutter velocity in case of the EE photographing, and for example, the exposure quantity determination device can be such constructed that a pointer is provided to serve as a stopper. While considering the photographing distance by $R_D$, and also considering the guide number and the film photosensitivity by $R_S$, the exposure meter $M_E$ shows the proper iris diaphragm for flash.

The indicating circuit I is provided mainly ascertain whether the exposure quantity is proper or not prior to the operation, and is preferably adapted to form a warning circuit, the construction of which indicates the improper operation.

In case of FIGS. 2 and 3 reference symbol $S_{W_1}$ designates a power source switch for the indicating circuit I and $S_{W_2}$ a power source switch for the exposure quantity determination circuit, but these switches are not necessarily interlocked with the shutter release button.

It is the necessary condition that reference symbol $S_{W_S}$ in FIG. 2 is interlocked with the shutter release button.

Figure 4:
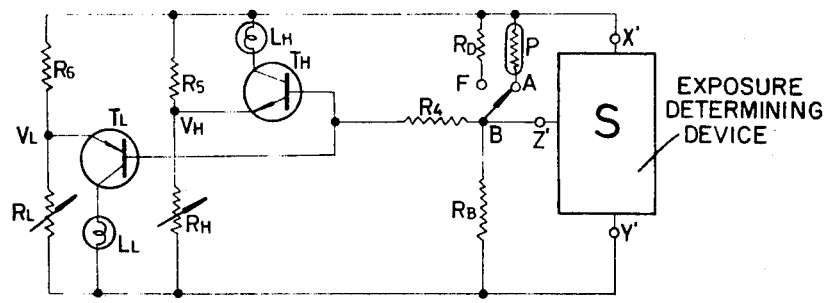
FIGS. 4 to 7 are electrical connection diagrams of other embodiments showing the details of indicating circuits of the devices according to the present invention.
Figure 5:
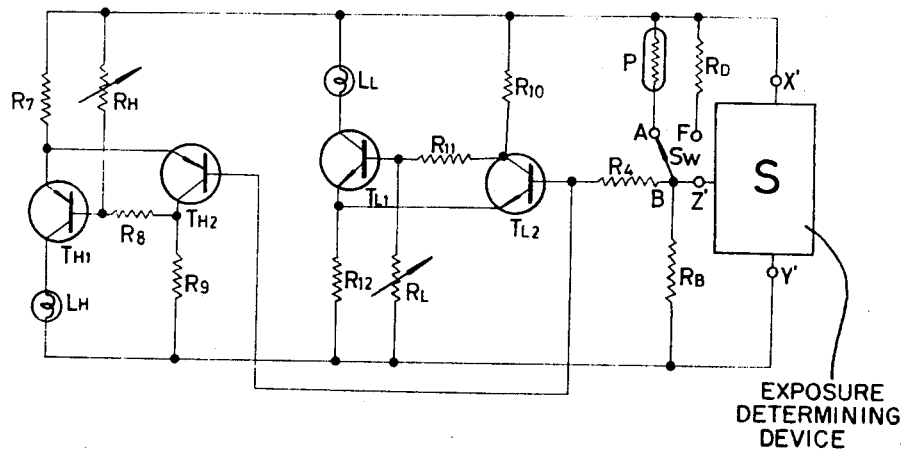
Figure 6:
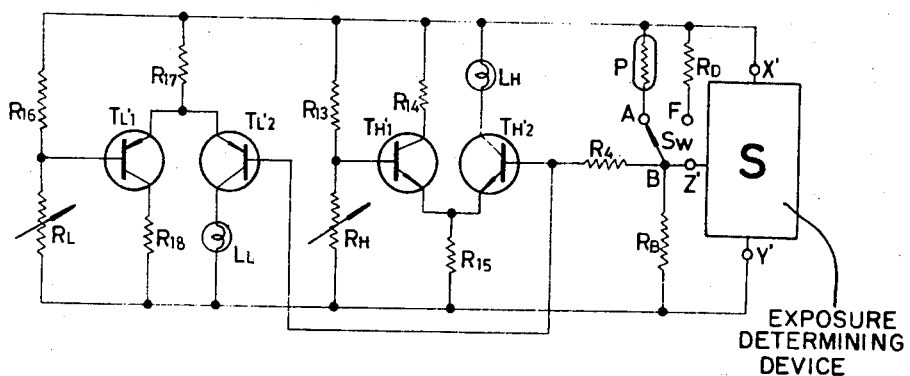
Figure 7:
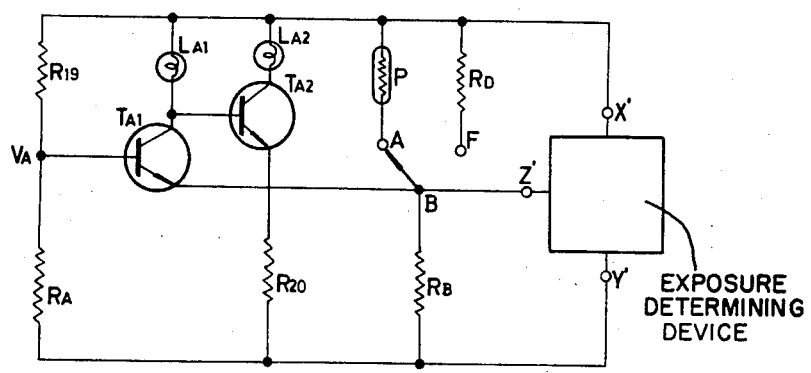

FIGS. 4 to 7 show the device according to the present invention, showing the exposure quantity determination circuit S as a black box and showing the details of the indicating circuit respectively. FIGS. 4 to 6 show the case of acuating two independent indicating circuits being combinedly provided by the same input, and FIG. 7 shows the case of actuating two cascade connection indicating circuits being concurrently provided.

In FIG. 4 the resistance devices $R_5$, $R_H$, $R_D$ and/or P, and $R_B$ constitute the four sides of a bridge circuit, and reference symbol $T_H$ designates a transistor being set to the ON of OFF state according to the detected terminal voltages $V_B$ through $V_H$ in this case, and $L_H$ an indicating lamp serving as its load. In case that $V_B$ is greater than $V_H$, namely, the exposure quantity is excessive, the lamp $L_H$ lights on. Similarly, the resistance devices $R_6$, $R_L$, $R_D$ and/or P, and $R_B$ constitute the four sides of another bridge circuit, and reference symbol $T_L$ designates a transistor being set to ON of OFF state according to the detected terminal voltages $V_L$ through $V_B$ in this case, and $L_L$ an indicating lamp serving as its load. As an indicating form there are cases that its indicating region is consisted of such three regions as lighting on only $L_H$, lighting on only $L_L$, and lighting on both $L_H$ and $L_L$, and that such three regions as lighting on only $L_H$, lighting on only $L_L$, and lighting off both $L_H$ and $L_L$. And also its boundary can be shifted by the regulation of $R_L$ and $R_H$. Reference symbol $R_4$ designates a resistor.

FIGS. 5 and 6 are shown to construct the indicating circuit I as the warning circuits of the positive motion type; FIG. 5 employing two sets of Schmitt circuits, and FIG. 6 employing two sets of differential amplifiers. In the drawings, reference symbols $T_{H_1}$, $T_{H_2}$, $T_{L_1}$, $T_{L_2}$ and $T_{H_1}'$, $T_{H_2}'$, $T_{L_1}'$, $T_{L_2}'$ designate transistors respectively, $L_H$ and $L_L$ lamps for higher and lower warning indications respectively, and $R_7$ to $R_{12}$ and $R_{13}$ to $R_{18}$ resistors respectively considering the temperature compensation as necessary.

In FIG. 7, the resistance devices $R_A$, $R_B$, $R_D$ and/or P and $R_{19}$ constitute the four sides of a bridge circuit, and the detected terminal voltage $V_A$ through $V_B$ are amplified by a transistor $T_{A_1}$, and the warning lamp $L_{A_1}$ lights off only when the proper exposure quantity. The shutter release may also be performed by eliminating $L_{A_1}$ and ascertaining the lighting-on of the proper exposure indicating lamp $L_{A_2}$ serving as a load of an inverse transistor $T_{A_2}$. The arrangement of $L_{A_1}$ and $L_{A_2}$ shown in the embodiment may be modified desirably.

The operational explanation of the present invention follows with reference to the embodiment of the present invention employing the exposure quantity determination circuit as shown in FIG. 2 and the indicating circuit as shown in FIG. 4.

First of all, both $S_{W_1}$ and $S_{W_2}$ are set on the OFF position and $S_{W_3}$ is set to the ON position by the shutter charge or the film winding-up interlocking therewith. $S_W$ is switched to A or F position respectively by switching to EE or flash. During flash photography when $S_W$ is switched to the F position, $S_{W_1}$ is set on the OFF position at first by pressing down the shutter release button, and the value of the electrical potential at the point B is determined by the power source E and the resistance devices $R_D$ and $R_B$. This value is represented as $V_B$. The electrical potential of $V_B$ is adapted to become the input of the indicating circuit I to indicate by lighting on the lamps $L_H$ and/or $L_L$. Assuming that $R_D$ becomes larger, that is, when photographing any object at a long distance, or that $R_D$ becomes smaller, that is, when photographing any object close by, namely, being beyond the interlocking range of the flash photographing of the camera, the photographer approaches or moves away apart from the object to be taken and makes the indicating lamp not to light on thereafter $S_{W_1}$ is set to the OFF position and also $S_{W_2}$ is set to the ON position by further pressing down the release button. The opening mechanism of the shutter and/or iris diaphragm starts along with being set $S_{W_3}$ on the OFF position. The time constant circuit operates on the basis $R_D$ and C. Then after elapse of the predetermined time the Schmitt circuit composed of transistors $T_1$ and $T_2$ operates to set $M_A$ to the OFF position. The shutter and/or iris diaphragm mechanism operate, and thus the shuttering time and/or the iris diameter are determined. In the case of the EE photography, they operate similarly to the case of the flash photography except that the point employing the resistance device P such as the photoconductive element or the like which varies its resistance value according to the brightness of the object to be taken. Furthermore, when operating out of the range of the EE photographing, the change-over switch $S_W$ may be interlocked by using a magnet instead of the lamp in the indicating circuit so as to switch automatically to flash photography. The automatic switching can be performed by employing a contactless switch using a transistor or the like which is set to the ON or OFF state according to the setting voltage.

Although the indicating circuit I is so constructed as to operate during the shuttering operation since the switch $S_W$ is interlocked with the shutter release button, the operational condition of the exposure quantity determination circuit can be predicted by actuating the indicating circuit in advance irrespective of the shutter release, provided that an independent $S_{W_1}$ temporarily provided is used.

In case of FIG. 4 the bridge circuit is formed by $R_5$, $R_H$ and above-mentioned $R_D$ and $R_B$ or P, and since the emitter of the transistor $T_H$ is connected to one of the output ends of the bridge circuit and the base thereof is connected to the other end, and the collector thereof is connected to the lamp $L_H$ serving as the load, $T_H$ is set to the ON or OFF state according to the magnitude relationship between said $V_B$ and voltage in which $V_{BE}$ of $T_H$ is added (or subtracted) to the electrical potential $V_H$ determined by $R_5$ and $R_H$, thus the lamp indication is obtained. In the drawing, the lamp $L_H$ lights on where $R_D$ becomes smaller. The value of $R_D$ or P for lighting on $L_H$ is adjustable by regulating $R_H$. The lower warning circuit having $T_L$ and $L_L$ is similarly operated. Where P is employed instead of $R_D$ upon switching to the EE photographing, the lamp $L_L$ lights on when the object to be taken is too dark, or the lamp $L_H$ lights on when being too bright, thus they are arranged to become the warning.

With respect to FIGS. 5 to 7, their operational explanation is omitted.

In summary the present invention skilfully adapts at least a portion of the input circuit of the exposure quantity determination circuit to the input of the indicating circuit without supplementing particular parts, and makes so-called automatic EE photographing and automatic flash photographing possible as described above, thus the photographer can always make proper photographing extremely suitable for the objects.

What is claimed is:

1. An exposure control apparatus for a camera having a flash affecting control, comprising circuit means for establishing a voltage, indicator means responsive to the voltage of said circuit means for indicating whether the voltage falls within a predetermined range, exposure control means responsive to the voltage of said circuit means for controlling the operation of the camera in response to the voltage of said circuit means, said circuit means having photosensitive means responsive to illumination and flash regulating means responsive to the setting of the flash affecting control, and switch means in said circuit means for alternately switching said photosensitive means and said flash regulator means into and out of said circuit means so that the voltage is alternately indicative of the illumination and the setting of the flash affecting control, whereby the voltage controls said indicator means and said exposure control means alternately on the basis of illumination and control setting, said indicator means including two indicating circuits operative of different levels in response to the voltage.

2. An apparatus, as in claim 1, wherein said exposure control circuit includes a triggering circuit having an electromagnet, said circuit means including a capacitor connectable for obtaining a time variation of the voltage.

3. An apparatus, as in claim 1, wherein said exposure control means includes current measuring means for determining the exposure.

4. An apparatus, as in claim 1, wherein one of said circuits operates at a level corresponding to a maximum exposure condition and the other circuit corresponding to a minimum exposure condition.

5. An apparatus, as in claim 1, wherein said circuits each includes two cascade connected amplifiers.

6. An apparatus, as in claim 1, wherein said circuits each includes a differential amplifier responsive to the voltage and an indicator.

7. An apparatus, as in claim 1, wherein said circuit means includes a resistor responding to the setting.

8. An apparatus, as in claim 1, wherein said circuits are a pair of Schmitt trigger circuits each responding to the voltage and each having different sensitivities for indicating a range.

9. An apparatus, as in claim 1, wherein said circuits are a pair of oppositely poled differential amplifiers each responsive to the voltage, and each having an indicator light.

10. An apparatus, as in claim 1, wherein the flash affecting control includes a focus control and said circuit means includes a resistor varying in response to the focus control.

11. An apparatus, as in claim 1, wherein said circuit means forms a voltage divider wherein the voltage constitutes a voltage divider tapoff, one portion of said voltage divider being composed alternately of said flash regulator means and said photosensitive means in response to said switch means.

12. An apparatus, as in claim 11, wherein said circuit means forms a voltage divider wherein the voltage constitutes a voltage divider tapoff, one portion of said voltage divider being composed alternately of said flash regulator means and said photosensitive means in response to said switch means.

13. An exposure determining apparatus for a camera, comprising exposure control means for determining the exposure value of the camera, a photoconductive cell, a resistive element adjustable to a resistive value between upper and lower values corresponding to a distance between maximum and minimum distances to a subject to be photographed, a second element, switching means for selectively connecting the second element alternatively into effective circuit arrangement with said resistive element and said photoconductive element, said exposure control means being connected to said second element, and indicating means connected to said element for whether the exposure condition is within a predetermined exposure range both when the photoconductive cell is connected to the second element, said indicating means including two switching circuit means each coupled to the second element and each being responsive to electrical conditions at the element reaching a different level for producing separate indications when the respective levels are reached.

14. An apparatus as in claim 13, wherein said exposure control means includes a triggering circuit having an electromagnet, said exposure control means including a capacitor connectable for obtaining a time variation of voltages across said second resistive element.

15. An apparatus as in claim 13, wherein said exposure control means includes current measuring means for determining the exposure.

16. An apparatus as in claim 13, wherein each of said circuit means included signalling means for producing the indications.

17. An apparatus as in claim 13, wherein said circuit means each includes two cascade connected amplifiers, one of said amplifiers being connected to said indicating means.

18. An apparatus as in claim 13, wherein said circuit means each includes a differential amplifier responsive to the input thereto and signalling means for producing the indication.

19. An apparatus, as in claim 16, wherein said circuit means each includes a pair of Schmitt trigger circuits each responding to the input and each having different sensitivities for establishing a range, each of said Schmitt trigger circuits being connected to one of said signalling means.

20. An apparatus as in claim 16 wherein said circuit means each includes a pair of oppositely poled differential amplifiers each responsive to the input, each of said signalling means having an indicator light connected to one of the pair of oppositely poled differential amplifiers.

21. An apparatus, as in claim 13, wherein said resistive element includes a focus control.

22. An apparatus, as in claim 13, wherein said second element is resistive and said first resistive element and said photoconductive cell respectively form a voltage divider with said second resistive element when connected in circuit therewith by said switch means.

* * * * *